US012716471B2

(12) United States Patent
Hisada et al.

(10) Patent No.: US 12,716,471 B2
(45) Date of Patent: Aug. 25, 2026

(54) DRIVE TRANSMISSION DEVICE AND CONSTRUCTION MACHINE

(71) Applicant: Nabtesco Corporation, Tokyo (JP)

(72) Inventors: Kazuki Hisada, Tokyo (JP); Etsuro Komori, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 82 days.

(21) Appl. No.: 18/742,511

(22) Filed: Jun. 13, 2024

(65) Prior Publication Data

US 2024/0328486 A1 Oct. 3, 2024

Related U.S. Application Data

(62) Division of application No. 17/671,072, filed on Feb. 14, 2022, now Pat. No. 12,038,070.

(30) Foreign Application Priority Data

Mar. 31, 2021 (JP) ................................ 2021-059737
Jun. 15, 2021 (JP) ................................ 2021-099557

(51) Int. Cl.
*F16H 19/08* (2006.01)
*E02F 3/36* (2006.01)
(Continued)

(52) U.S. Cl.
CPC ........... *F16H 19/08* (2013.01); *E02F 3/3604* (2013.01); *E02F 9/006* (2013.01); *E02F 9/202* (2013.01);
(Continued)

(58) Field of Classification Search
CPC ...... F16H 19/08; F16H 1/32; F16H 2001/323; E02F 3/3604; E02F 9/006
See application file for complete search history.

(56) References Cited

U.S. PATENT DOCUMENTS 4,760,759 A 8/1988 Blake
5,513,603 A 5/1996 Ang
(Continued)

FOREIGN PATENT DOCUMENTS

JP 3-48045 A 3/1991
JP 2001-065595 A1 3/2001
(Continued)

OTHER PUBLICATIONS

Notice of Reasons for Refusal dated Jan. 7, 2025, issued in corresponding Japanese Patent Application No. 2021-099557 with English translation (6 pgs.).

*Primary Examiner* — Derek D Knight
(74) *Attorney, Agent, or Firm* — Pillsbury Winthrop Shaw Pittman, LLP

(57) ABSTRACT

A drive transmission device according to one embodiment of the disclosure includes: an arm having a motor that generates a rotational force; a speed reducer that is provided in the arm and has a carrier for decelerating rotation of the motor and outputting the decelerated rotation; a bucket fixed to the carrier by a reamer bolt, the reamer bolt being inserted in a bracket through hole formed in the bucket; and a resin bush provided between an internal surface of the bracket through hole and an external lateral surface of the reamer bolt. The mechanical strength of the resin bush is lower than the mechanical strength of the bucket and the mechanical strength of the reamer bolt.

5 Claims, 6 Drawing Sheets

(51) Int. Cl.

| | |
|---|---|
| ***E02F 9/00*** | (2006.01) |
| ***E02F 9/20*** | (2006.01) |
| ***F16H 1/32*** | (2006.01) |
| ***F16H 35/10*** | (2006.01) |

(52) U.S. Cl.
CPC ............... *F16H 1/32* (2013.01); *F16H 35/10* (2013.01); *F16H 2001/323* (2013.01)

(56) References Cited

U.S. PATENT DOCUMENTS

| | | | | |
|---|---|---|---|---|
| 8,684,879 | B2 * | 4/2014 | Nakamura | F16H 3/70 475/179 |
| 9,329,119 | B2 * | 5/2016 | Shirata | G01N 21/25 |
| 9,695,911 | B2 | 7/2017 | Uchihara | |
| 2012/0215358 | A1 | 8/2012 | Gettings | |
| 2014/0252723 | A1 | 9/2014 | Guidi | |
| 2020/0096107 | A1 * | 3/2020 | Akao | F16H 1/32 |
| 2020/0290192 | A1 | 9/2020 | Ma et al. | |

FOREIGN PATENT DOCUMENTS

| | | | |
|---|---|---|---|
| JP | 2001-193794 | A | 7/2001 |
| JP | 2019-104070 | A | 6/2019 |

* cited by examiner

DRIVE TRANSMISSION DEVICE AND CONSTRUCTION MACHINE

CROSS-REFERENCE TO RELATED APPLICATIONS

This application is a Divisional of U.S. application Ser. No. 17/671,072 (filed on Feb. 14, 2022), which in turn is based on and claims the benefit of priority from Japanese Patent Application Serial Nos. 2021-059737 (filed on Mar. 31, 2021) and 2021-099557 (filed on Jun. 15, 2021), the contents of each of which are incorporated herein.

TECHNICAL FIELD

The present disclosure relates to a drive transmission device and a construction machine.

BACKGROUND

Joints of a robot and other machines, for example, include a gear mechanism that includes a plurality of gears that are driven by a motor or the like. Various techniques have been proposed to mitigate transmission of external impact loads to the gear mechanism and extend the product life. In one of the techniques, for example, an elastic member may be connected at each end to two members (links) to which gears engaged with each other are fixed, and a stopper pin may be provided in one of the two members. The other of the two members is pressed against the stopper pin by the elastic member.

In this configuration, the two members normally move together as a single body since the other of the two members is pressed against the stopper pin. Whereas when an external impact load is applied to either of the two members, the two members move relative to each other against a spring force of the elastic member. This mitigates the transmission of the external impact load on one of the two members to the other of the two members. In this way, it is possible to reduce the impact load transmitted to the gear mechanism (for example, see Japan Patent Application Publication No. 2019-104070).

However, in the conventional technology described above, it is necessary to install the elastic member and stopper pin in separate locations from the gear mechanism. In other words, it is difficult to incorporate the elastic member and stopper pin into the gear mechanism. This makes it difficult to reduce the overall size of the device.

SUMMARY

The present disclosure provides a drive transmission device and construction machinery that can be downsized while mitigating external impact loads.

A drive transmission device according to one aspect of the disclosure includes: a first member having a drive source that generates a rotational force; a speed changer provided in the first member, the speed changer having an output portion that changes a speed of rotation of the drive source and outputting a speed-changed rotation; a second member fixed to the output portion with a fixing member, the second member having a through hole for receiving the fixing member therein; and a buffer member provided between an internal surface of the through hole and an external lateral surface of the fixing member. A mechanical strength of the buffer member is lower than a mechanical strength of the second member and a mechanical strength of the fixing member.

With such a configuration, it is possible to absorb an external impact load applied to the second member by the buffer member, and it is possible to reduce the impact load transmitted to the speed changer. Moreover, the buffer member is provided between the outer surface of the fixing member fixed to the output portion and the inner surface of the through hole formed in the second member. Thus, there is no need to provide a space for the buffer member at a position separated from the speed changer, and the buffer member can be incorporated as a part of the speed changer. Therefore, the drive transmission device can be reduced in size while reducing the external impact load applied thereto.

In the above configuration, the buffer member may be formed of resin.

In the above configuration, the fixing member may include a pin portion inserted in the through hole; and a male screw portion integrally and coaxially molded with the pin portion at one end of the pin portion situated on one side in its axial direction. The output portion may include: a female thread portion for receiving the male screw portion engaged therewith; and a fitting recess for receiving the one end of the pin portion fitted therein.

In the above configuration, the fixing member may include: a bolt inserted in the through hole; and a hollow pin fitted between the bolt and the buffer member. The output portion may include: a female thread portion for receiving the bolt engaged therewith; and a fitting recess for receiving one end of the hollow pin situated one side in its axial direction.

In the above configuration, a holding plate may be provided on a side of the second member opposite to the output portion such that it covers the buffer member. The holding plate may have a plate through hole for receiving the fixing member.

In the above configuration, the speed changer may include: a casing relatively rotates about a first rotation axis and the output portion; at least one crankshaft disposed between the casing and the output portion, the crankshaft being rotated on a second rotation axis extending along the first rotation axis by the rotation of the drive source; and an external teeth member having external teeth that are oscillatory rotated about the first rotation axis by the crankshaft. The casing may have internal teeth that mesh with the external teeth. The casing may be fixed to the first member. The output portion may rotatably support the crankshaft and be rotatably supported by the casing via a bearing. The output portion may rotate at a reduced speed than that of the rotation of the crankshaft.

A drive transmission device according to another aspect of the disclosure includes: a first member having a drive source that generates a rotational force; a speed changer provided in the first member, the speed changer having an output portion that changes a speed of rotation of the drive source and outputting a speed-changed rotation; a second member fixed to the output portion with a fixing member, the second member having a through hole for receiving the fixing member therein; and a buffer member formed of a resin having a mechanical strength lower than a mechanical strength of the second member and a mechanical strength of the fixing member and disposed between an inner surface of the through hole and an outer lateral surface of the fixing member; and a holding plate provided on a side of the second member opposite to the output portion such that it covers the buffer member, the holding plate having a plate through hole for receiving the fixing member therein. The fixing member may include: a pin portion inserted in the through hole; and a male screw portion integrally and coaxially molded with the pin portion at one end of the pin portion situated on one side in its axial direction. The output portion includes: a female thread portion for receiving the male screw portion engaged therewith; and a fitting recess for receiving the one end of the pin portion fitted therein. The speed changer includes: a casing relatively rotates about a first rotation axis and the output portion; at least one crankshaft disposed between the casing and the output portion, the crankshaft being rotated on a second rotation axis extending along the first rotation axis by the rotation of the drive source; and an external teeth member having external teeth that are oscillatory rotated about the first rotation axis by the crankshaft. The casing has internal teeth that mesh with the external teeth. The casing is fixed to the first member. The output portion rotatably supports the crankshaft and is rotatably supported by the casing via a bearing. The output portion rotates at a reduced speed than that of the rotation of the crankshaft.

With such a configuration, it is possible to absorb an external impact load applied to the second member by the buffer member, and it is possible to reduce the impact load transmitted to the speed changer. Moreover, the buffer member is provided between the outer surface of the fixing member fixed to the output portion and the inner surface of the through hole formed in the second member. Thus, there is no need to provide a space for the buffer member at a position separated from the speed changer, and the buffer member can be incorporated as a part of the speed changer. Therefore, the drive transmission device can be reduced in size while reducing the external impact load applied thereto. Since the buffer member is made of resin, the buffer member can be easily formed. The fixing member includes a pin portion inserted in the through hole, and a male screw portion integrally and coaxially molded with the pin portion at one end of the pin portion situated on one side in its axial direction. The output portion includes a female thread portion for receiving the male screw portion engaged therewith, and a hole for receiving one end of the pin portion situated one side in its axial direction. Therefore, the output portion can be firmly fixed to the output portion. The rotation of the output portion can be reliably transmitted to the second member via the fixing member. Therefore, it is possible to prevent the buffer member having a weak mechanical strength from being exposed to the outside. It is also possible to prevent foreign matter such as dusts and sands from coming into contact with the buffer member. In this way, the product life of the buffer member can be extended. With such a speed changer, a high output can be obtained at a high reduction ratio. Therefore, it is possible to increase drive torques of the first member and the second member while reducing the size of the drive transmission device. Further, it is possible to increase the contact ratio between the gears of the speed changer, which improves the resistance of the drive transmission device against overloads and impact loads.

A drive transmission device according to yet another aspect of the disclosure includes: a first member having a drive source that generates a rotational force; a speed changer provided in the first member, the speed changer having an output portion that changes a speed of rotation of the drive source and outputting a speed-changed rotation; a second member fixed to the output portion with a fixing member, the second member having a through hole for receiving the fixing member therein; and a buffer member formed of a resin having a mechanical strength lower than a mechanical strength of the second member and a mechanical strength of the fixing member and disposed between an inner surface of the through hole and an outer lateral surface of the fixing member; and a holding plate provided on a side of the second member opposite to the output portion such that it covers the buffer member, the holding plate having a plate through hole for receiving the fixing member therein. The fixing member includes: a bolt inserted in the through hole; and a hollow pin fitted between the bolt and the buffer member. The output portion may include: a female thread portion for receiving the bolt engaged therewith; and a fitting recess for receiving one end of the hollow pin situated one side in its axial direction. The speed changer includes: a casing relatively rotates about a first rotation axis and the output portion; at least one crankshaft disposed between the casing and the output portion, the crankshaft being rotated on a second rotation axis extending along the first rotation axis by the rotation of the drive source; and an external teeth member having external teeth that are oscillatory rotated about the first rotation axis by the crankshaft. The casing has internal teeth that mesh with the external teeth. The casing is fixed to the first member. The output portion rotatably supports the crankshaft and is rotatably supported by the casing via a bearing. The output portion rotates at a reduced speed than that of the rotation of the crankshaft.

With such a configuration, it is possible to absorb an external impact load applied to the second member by the buffer member, and it is possible to reduce the impact load transmitted to the speed changer. Moreover, the buffer member is provided between the outer surface of the fixing member fixed to the output portion and the inner surface of the through hole formed in the second member. Thus, there is no need to provide a space for the buffer member at a position separated from the speed changer, and the buffer member can be incorporated as a part of the speed changer. Therefore, the drive transmission device can be reduced in size while reducing the external impact load applied thereto. Since the buffer member is made of resin, the buffer member can be easily formed. The fixing member includes the pin portion inserted in the through hole; and the male screw portion integrally and coaxially molded with the pin portion at one end of the pin portion situated on one side in its axial direction. The output portion includes the female thread portion for receiving the male screw portion engaged therewith; and the hole for receiving one end of the pin portion situated one side in its axial direction. Thus, the output portion can be firmly fixed to the output portion. The rotation of the output portion can be reliably transmitted to the second member via the fixing member. Therefore, it is possible to prevent the buffer member having a weak mechanical strength from being exposed to the outside. It is also possible to prevent foreign matter such as dusts and sands from coming into contact with the buffer member. In this way, the product life of the buffer member can be extended. With such a speed changer, a high output can be obtained at a high reduction ratio. Therefore, it is possible to increase drive torques of the first member and the second member while reducing the size of the drive transmission device. Further, it is possible to increase the contact ratio between the gears of the speed changer, which improves the resistance of the drive transmission device against overloads and impact loads.

A construction machine according to another aspect of the disclosure includes: a vehicle body; a first member provided in the vehicle body and having a drive source that generates a rotational force; a speed changer provided in the first member, the speed changer having an output portion that changes a speed of rotation of the drive source and outputting a speed-changed rotation; a second member fixed to the output portion with a fixing member, the second member having a through hole for receiving the fixing member therein; and a buffer member provided between an internal surface of the through hole and an external lateral surface of the fixing member. The mechanical strength of the buffer member is lower than the mechanical strength of the second member and the mechanical strength of the fixing member.

With such a configuration, it is possible to absorb an external impact load applied to the second member by the buffer member, and it is possible to reduce the impact load transmitted to the speed changer. Moreover, the buffer member is provided between the outer surface of the fixing member fixed to the output portion and the inner surface of the through hole formed in the second member. Thus, there is no need to provide a space for the buffer member at a position separated from the speed changer, and the buffer member can be incorporated as a part of the speed changer. Therefore, the construction machine as a whole can be reduced in size while reducing the external impact load applied thereto.

As described above, in the drive transmission device and construction machine according to the aspects, there is no need to provide a space for the buffer member at a position separated from the speed changer, and the buffer member can be incorporated as a part of the speed changer. Therefore, the drive transmission device can be reduced in size while reducing the external impact load.

DESCRIPTION OF THE EMBODIMENTS

The following describes embodiments of the present disclosure with reference to the drawings.

<Excavator>

Figure 1:
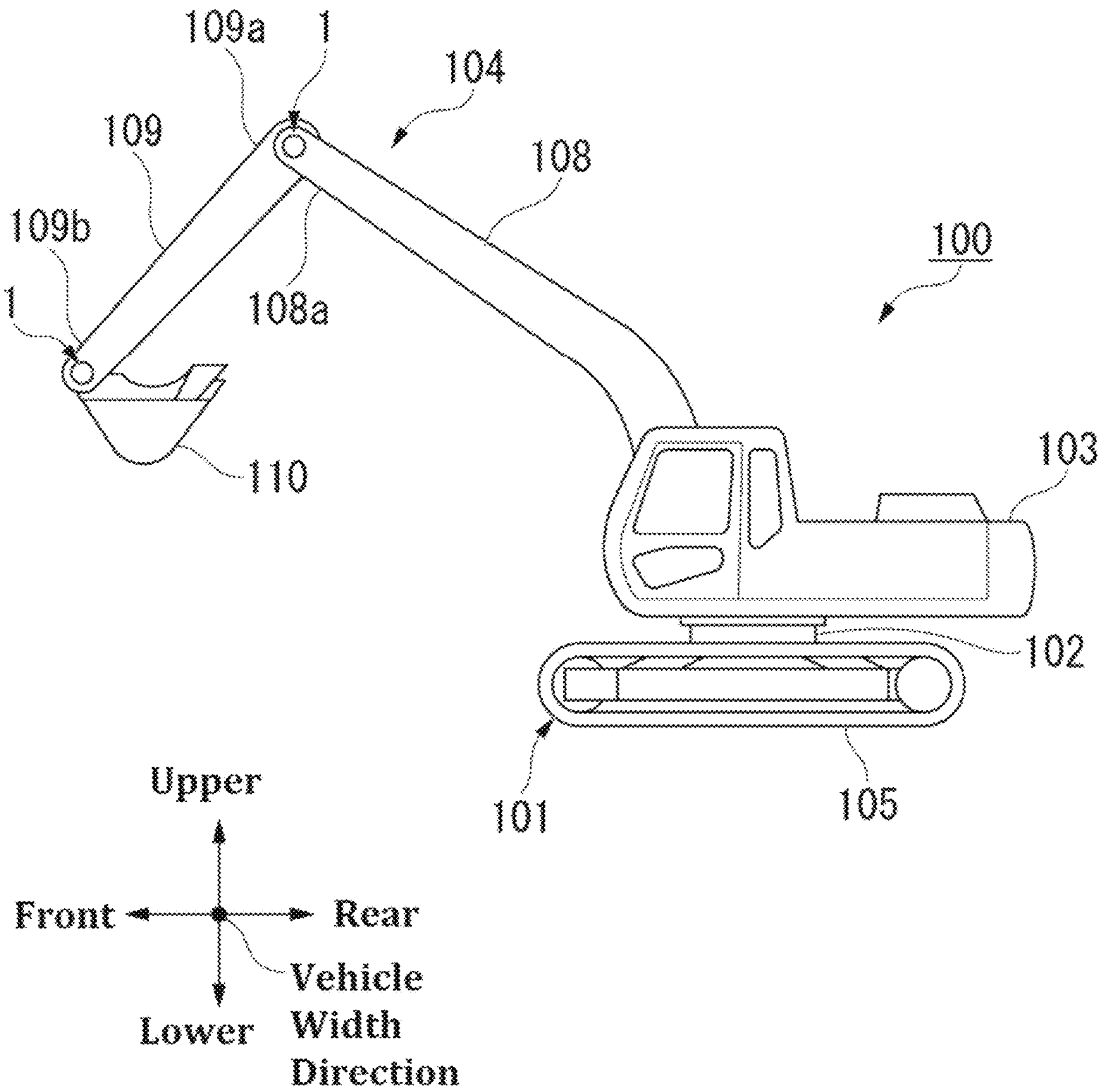
FIG. 1 schematically illustrates a configuration of an excavator according to embodiments of the present disclosure, viewed from the side.

FIG. 1 schematically illustrates an excavator 100, which is an embodiment of a construction machine according to one aspect of the disclosure, viewed from the side. In the following description, a front direction to which an operator of the excavator 100 faces is simply referred to as the front. The opposite side to the front in the horizontal direction is referred to as the rear. The upper and lower directions of the excavator 100 placed on a road surface is simply referred to as the vertical direction. A direction orthogonal to the front-rear direction and the vertical direction is referred to as a vehicle width direction. FIG. 1 shows the excavator 100 as viewed from the vehicle width direction.

As shown in FIG. 1, the excavator 100 includes a self-propelled undercarriage 101, a slewable upper structure 103 that is provided on top of the undercarriage 101 via a slewing mechanism 102 and slews or rotates relative to the undercarriage 101, and an operating unit 104 provided on the slewable upper structure 103. The undercarriage 101 and the slewing mechanism 102 are driven, for example, by an unshown electric motor with a reducer. The traveling body 101 includes, for example, two continuous tracks 105 arranged side by side in the vehicle width direction. The configurations are not limited to this, and wheels or the like may be used instead of the continuous tracks 105.

The operating unit 104 includes a boom 108 and arm 109 extending in the front-rear direction, and a bucket 110. The boom 108, the arm 109, and the bucket 110 are rotatably connected to each other via the drive transmission devices 1. Specifically, one end of the boom 108 (this end of the boom 108 in the longitudinal direction and the drive transmission device 1 provided at this end are not shown in FIG. 1) in the longitudinal direction is rotatably coupled to the slewable upper structure 103 via the drive transmission device 1. One end 109*a* of the arm 109 in the longitudinal direction is rotatably coupled to the other end 108*a* of the boom 108 in the longitudinal direction via the drive transmission device 1. The bucket 110 is rotatably coupled to the other end 109*b* of the arm 109 in the longitudinal direction via the drive transmission device 1. The drive transmission devices 1 provided in the above sections all have the same configuration. Therefore, in the following description, only the drive transmission device 1 that couples the bucket 110 to the other end 109*b* in the longitudinal direction of the arm 109 will be described. Description of the other drive transmission devices 1 will be hereunder omitted.

Figure 2:
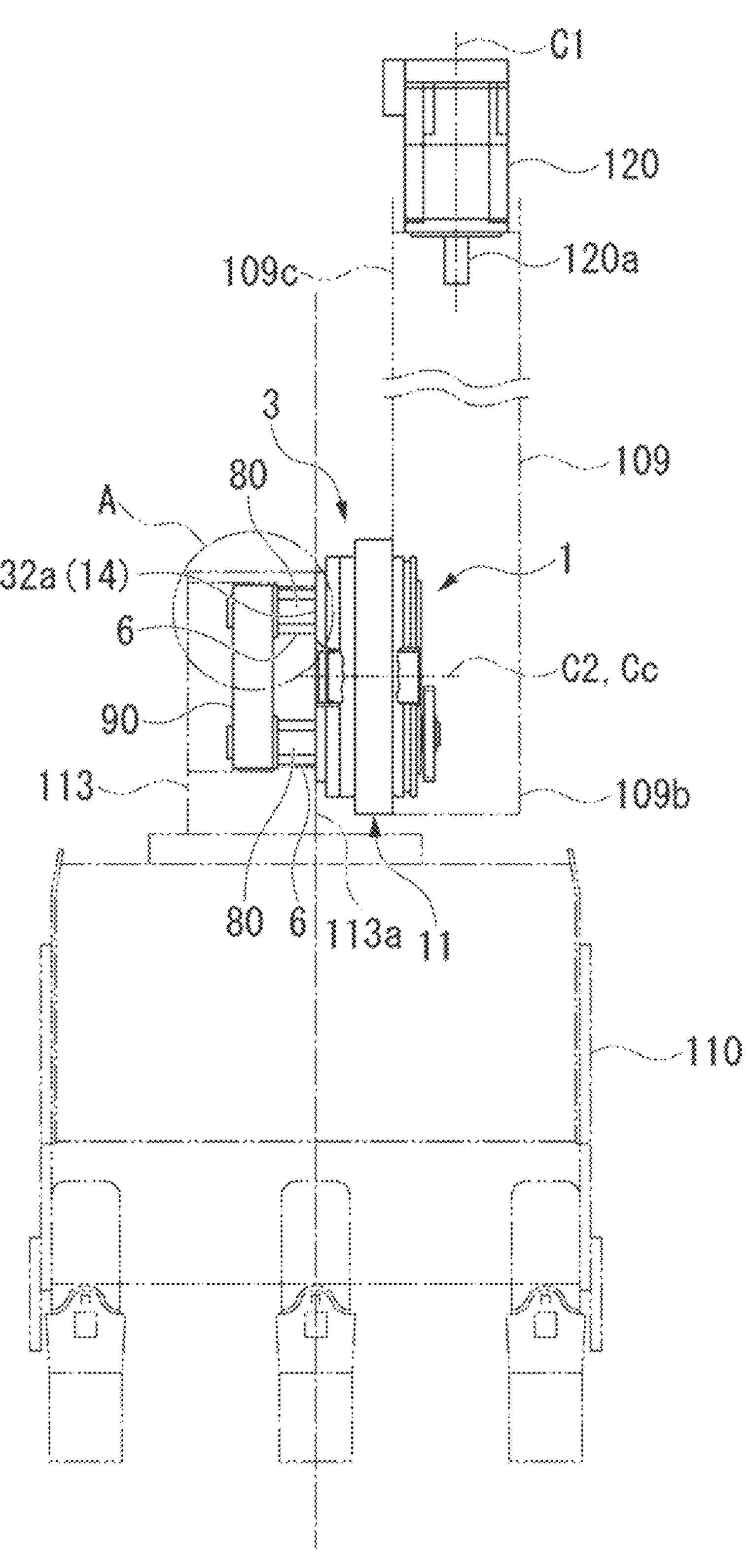
FIG. 2 schematically illustrates a coupling portion in detail between an arm and a bucket in the first embodiment of the disclosure.

FIG. 2 schematically illustrates the coupling portion between the arm 109 and the bucket 110 in detail. In FIG. 2, the arm 109 and the bucket 110 are shown by a dashed-two dotted line for the sake of clarity. As shown in FIG. 2, a motor (an example of a drive source in the claims) 120 is provided in the arm 109, and the rotational force of the motor 120 is transmitted to the bucket 110 via the drive transmission device 1. That is, the arm 109 is an example of the first member in the claims. The bucket 110 is an example of the second member in the claims. The motor 120 is disposed such that a motor shaft 120*a* rotatable about a first rotation axis C1 faces the bucket 110. The first rotation axis C1 of the motor shaft 120*a* and the longitudinal direction of the arm 109 coincide with each other.

First Embodiment

<Drive Transmission Device>

The drive transmission device 1 includes a speed reducer 3 attached to the other end 109*b* of the arm 109 in the longitudinal direction, a reamer bolt 80 (an example of the fixing member in the claims) for fixing the speed reducer 3 and the bucket 110, a resin bush 6 (an example of a buffer member in the claims) provided between an outer circumference of the reamer bolt 80 and the bucket 110, and a holding plate 90 for pressing the resin bush 6 from the side opposite to the speed reducer 3.

<Speed Reducer>

Figure 3:
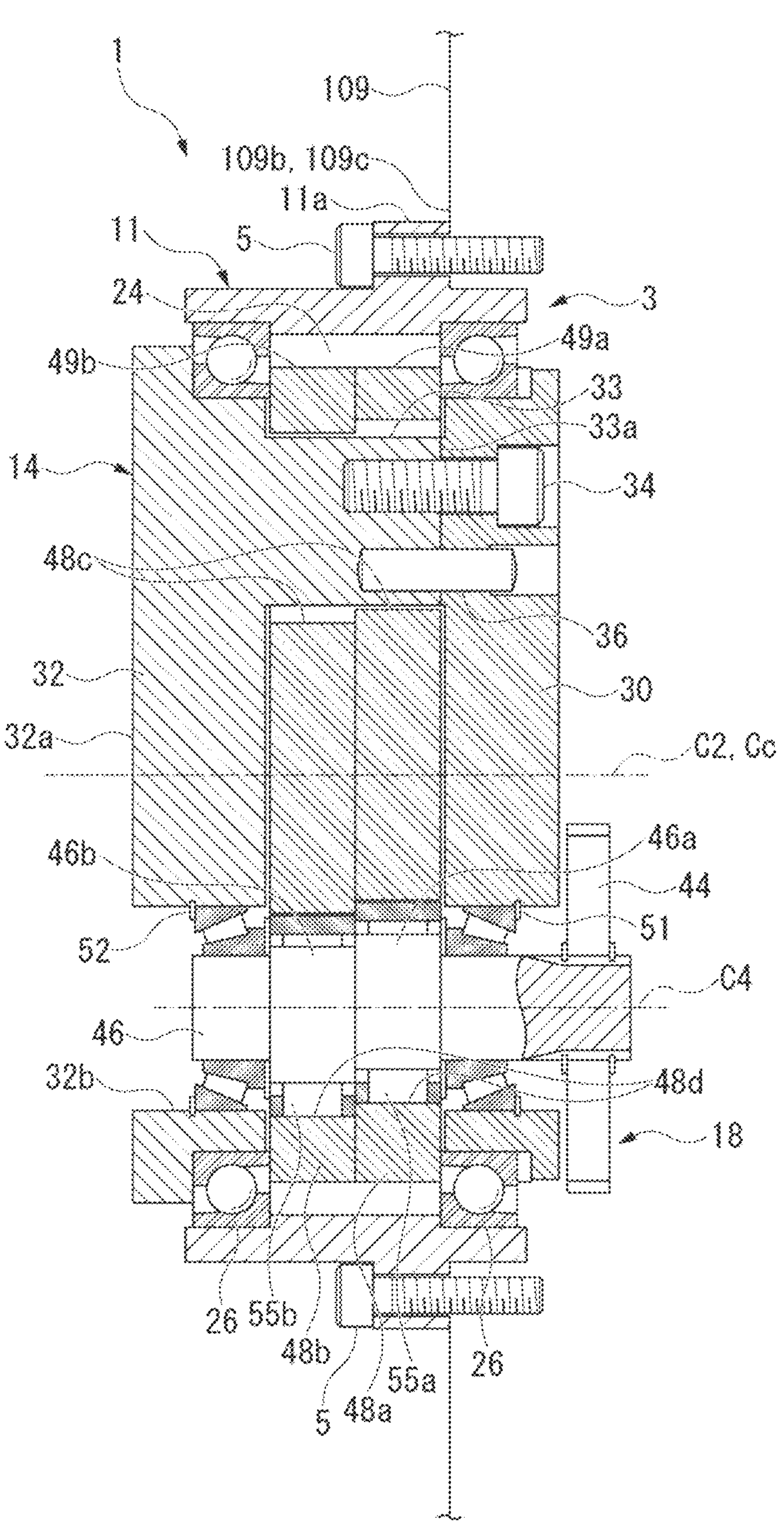
FIG. 3 schematically illustrates a configuration of a speed reducer in the first embodiment.

FIG. 3 schematically shows the configuration of the speed reducer 3. As shown in FIGS. 2 and 3, the reducer 3 includes a cylindrical casing 11 attached to one side surface 109*c* of the arm 109 in a transversal direction, a carrier 14 disposed radially inside the casing 11, and a reducer output portion 18 that rotates the carrier 14 at a rotation speed reduced at a predetermined ratio with respect to a rotation speed of the motor shaft 120*a*.

<Casing>

The casing 11 has a substantially cylindrical shape. A central axis Cc of the casing 11 coincides with a second rotation axis C2 of the bucket 110 relative to the arm 109 (an example of the first rotation axis in the claims). In the following description, the direction parallel to the second rotation axis C2 may be referred to as an axial direction. The rotational direction about the second rotation axis C2 may be referred to as a circumferential direction. The direction orthogonal to the axial direction and the circumferential direction may be referred to as a radial direction.

An outer flange portion 11*a* projecting outward in the radial direction is integrally formed with the outer circumferential surface of the casing 11. The outer flange portion 11*a* has a rectangular section along the axial direction. The side surface 109*c* of the arm 109 is fastened and fixed to the outer flange portion 11*a* by bolts 5. Internal teeth 24 are provided on an inner circumferential surface of the casing 11. The internal teeth 24 are pin-shaped (cylindrical) teeth provided on an inner peripheral surface of the case 11. Two or more internal teeth 24 are arranged at equal intervals in the circumferential direction.

<Carrier>

More specifically, the carrier 14 is rotatably supported by the casing 11 via a pair of main bearings 26 (one example of the bearings in the claims) disposed at a distance from each other in the axial direction of the casing 11. The main bearing 26 is, for example, an angular contact ball bearing. The carrier 14 is situated on the same axis as the casing 11 and the second rotation axis C2.

The carrier 14 includes an end plate portion 30 situated on the arm 109 side in the axial direction, and a base plate portion 32 disposed on the opposite side to the arm 109, and three cylindrical column portions 33 that are integrally molded with the base plate portion 32 and protrude out from the base plate portion 32 toward the end plate portion 30. The pillar portions 33 are arranged at equal intervals in the circumferential direction. The end plate portion 30 is disposed at tips 33*a* of the pillar portions 33. The end plate portion 30 is fastened and fixed to the pillar portions 33 by bolts 34. In this state, a space having a predetermined width in the axial direction is formed between the base plate portion 32 and the end plate portion 30.

A pin 36 for positioning the end plate portion 30 with respect to the base plate portion 32 is provided slightly inner in the radial direction than the bolt 34 in the pillar portion 33. The pin 36 is disposed such that it spans the pillar portion 33 and the end plate portion 30. The pillar portion 33 and the base plate portion 32 are not necessary formed integrally with each other. In this case, the pillar portion 33 is fastened to the base plate portion 32. The configuration of the pillar portions 33 is not limited to such a columnar shape. The pillar portions 33 may be formed in any shape or configuration provided that they form a space having a certain width in the axial direction between the base portion 32 and the end plate portion 30.

The end plate portion 30 and the base portion 32 are formed with a plurality of through holes 30*c* and 32*b* (for example, three in this embodiment) into which a crankshaft 46 described later of the speed reducer output portion 18 is inserted. The through holes 30*c* and 32*b* are arranged at equal intervals in the circumferential direction.

<Speed Reducer Output Portion>

The speed reducer output portion 18 includes two or more transmission gears 44 (for example, three in this embodiment) to which rotation of the motor shaft 120*a* of the motor 120 is transmitted, two or more crankshafts 46 (three in this embodiment) having one end fixed to the transmission gear 44, a first external gear 48*a* (an example of the external teeth member in the claims) and a second external gear 48*b* (an example of the external teeth member in the claims) that oscillatory rotate with the rotation of the crankshaft 46. The rotation of the motor shaft 120*a* is transmitted to the transmission gears 44 via, for example, a bevel gear(s) (not shown) or the like.

The transmission gear 44 is fixed to one end of the crankshaft 46. Thus, the rotation of a first operating output shaft 76*a* is transmitted to the crankshaft 46 via the transmission gear 44. The crankshafts 46 are arranged extending along the axial direction. In other words, the crankshaft 46 rotates on a crank rotation axis C4 parallel to the second rotation axis C2 (an example of the other rotation axis in the claims). The crankshaft 46 is rotatably supported by the end plate portion 30 via a first crank bearing 51. The crankshaft 46 is rotatably supported on the base plate portion 32 via a second crank bearing 52. The first crank bearing 51 and the second crank bearing 52 are, for example, tapered roller bearings.

At the center of the crankshaft 46 in the axial direction, a first eccentric portion 46*a* and a second eccentric portion 46*b* disposed eccentrically from the axial center of the crankshaft 46 are provided. The first and second eccentric portions 46*a*, 46*b* are disposed adjacent to each other in the axial direction between the first crank bearing 51 and the second crank bearing 52. The first eccentric portion 46*a* is disposed adjacent to the first crank bearing 51. The second eccentric portion 46*b* is disposed adjacent to the second crank bearing 52. The first eccentric portion 46*a* and the second eccentric portion 46*b* are out of phase with each other. These crankshafts 46 are inserted into the through holes 30*c* and 32*b* in the end plate portion 30 and the base plate portion 32, respectively. That is, the crankshafts 46 are also arranged at equal intervals in the circumferential direction like the through holes 30*c* and 32*b*.

A first roller bearing 55*a* is attached to the first eccentric portion 46*a* of the crankshaft 46. A second roller bearing 55*b* is attached to the second eccentric portion 46*b*. The first roller bearing 55*a* is, for example, a cylindrical roller bearing. The first roller bearing 55*a* includes a plurality of rollers 56 and a cage 57 for holding the plurality of rollers 56. Since the second roller bearing 55*b* has the same configuration as the first roller bearing 55*a*, detailed description thereof will be omitted. The first external gear 48*a* and the second external gear 48*b* are oscillatory rotated in conjunction with the rotation of the crankshaft 46 via the roller bearings 55*a* and 55*b*.

The first and second external gears 48*a*, 48*b* are disposed in a space between the base plate portion 32 of the carrier 14 and the end plate portion 30. The first external gear 48*a* and the second external gear 48*b* have external teeth 49*a* and 49*b* respectively that mesh with the internal teeth 24 of the casing 11. In the first external gear 48*a* and the second external gear 48*b*, formed are a first through hole 48*c* into which the pillar portion 33 is inserted, and second through holes 48*d* into which the eccentric portions 46*a* and 46*b* of the crankshaft 46 are inserted.

The first eccentric portion 48*a* of the crankshaft 46 and the first roller bearing 55*a* are inserted into the second through hole 48*d* of the first external gear 48*a*. The second eccentric portion 46*b* of the crankshaft 46 and the second roller bearing 55*b* are inserted into the second through hole 48*d* of the second external gear 48*b*. The first eccentric portion 46*a* and the second eccentric portion 46*b* are oscillatory rotated by the rotation of the crankshaft 46, and thus the first external gear 48*a* and the second external gear 48*b* are oscillatory rotated while they mesh with the internal teeth 24 of the casing 11.

<Fixing Structure Between Reducer and Bucket>

Figure 4:
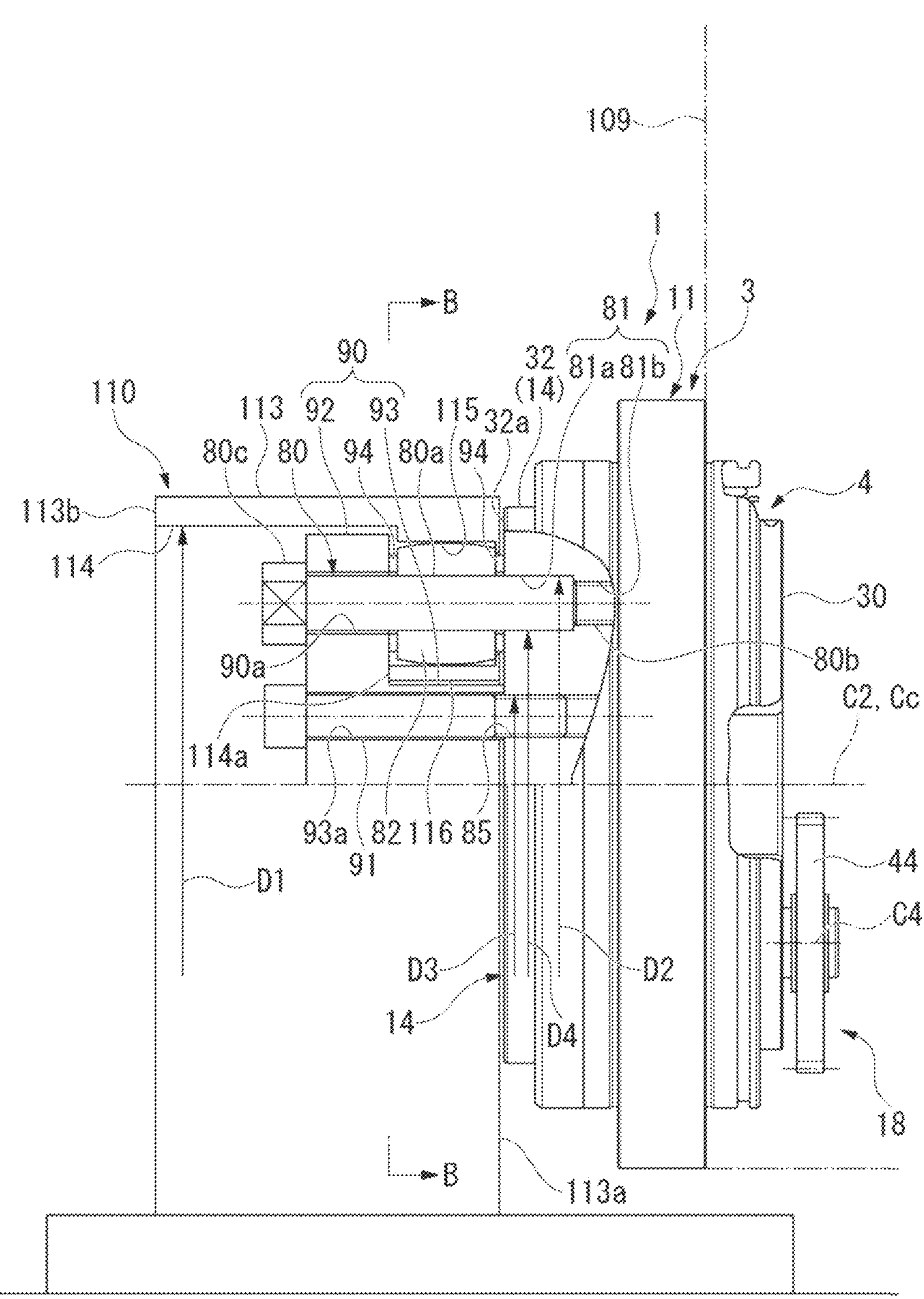
FIG. 4 is a detailed view of a portion A of FIG. 2.
Figure 5:
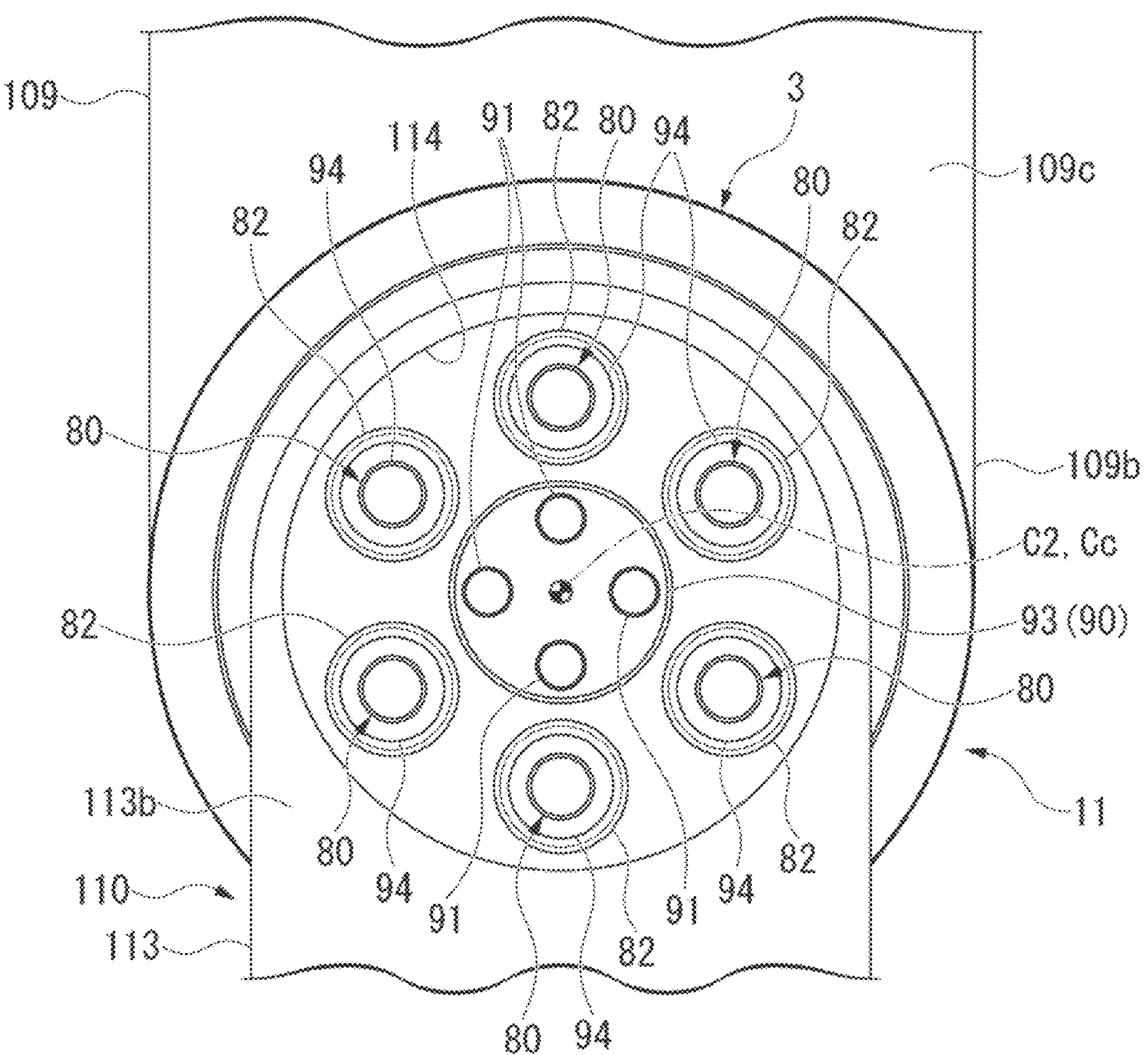
FIG. 5 is a sectional view along the B-B line in FIG. 4.

FIG. 4 is a detailed view of the portion A of FIG. 2. FIG. 5 is a sectional view along the B-B line in FIG. 4. As shown in FIGS. 2, 4, and 5, the bucket 110 is fastened and fixed to the base plate portion 32 of the carrier 14 by the holding plate 90 and a holding plate bolt 91. In addition to the holding plate bolt 91, the bucket 110 is fastened to the base plate portion 32 of the carrier 14 by the reamer bolt 80. The reamer bolt 80 includes a pin portion 80*a*, a male screw portion 80*b* integrally and coaxially molded with the pin portion 80*a* at one end of the pin portion 80*a* located on one side in the axial direction, and a head portion 80*c* integrally molded coaxially with the pin portion 80*a* at the other end portion located on the other side of the pin portion 80*a* in the axial direction.

On an end surface 32*a* of the base plate portion 32 opposite to the end plate portion 30, a plurality of receiving recesses 81 for receiving the reamer bolts 80 (for example, six in the first embodiment) are equidistantly formed in the circumferential direction in the outer peripheral portion of the end surface 32*a*. The receiving recess 81 includes a fitting recess 81*a* formed in the end surface 32*a* of the base plate portion 32 and a female thread portion 81*b* for a reamer bolt formed in the bottom portion of the fitting recess 81*a*. Of the pin portion 80*a* of the reamer bolt 80, the male screw portion 80*b* side is fitted into the fitting recess 81*a*. The male screw portion 80*b* of the reamer bolt 80 is engaged with the female thread portion 81*b* for the reamer bolt.

In the end surface 32*a* of the base plate portion 32, a plurality of female thread portions 85 for bolts (for example, four in the first embodiment) are formed at positions radially inner than the receiving recess 81 at equal intervals in the circumferential direction. The holding plate bolts 91 are engaged with the female thread portions 85.

The bucket 110 has a blockish attachment bracket 113 that is disposed on the end surface 32*a* of the base plate portion 32. The attachment bracket 113 is fastened to the base plate portion 32 of the carrier 14 by the holding plate 90, the holding plate bolt 91, and the reamer bolt 80. One side surface 113*a* of the attachment bracket 113 overlaps with the end surface 32*a* of the base plate portion 32. A recess 114 is formed at the radial center of and in a large part of the other side surface 113*b* of the attachment bracket 113. The recess 114 is formed in a circular shape centered on the second rotation axis C2 when viewed from the axial direction. A diameter D1 of the recess 114 is larger than a diameter D2 of the circle that is centered on the second rotation axis C2 and contacts the radially outer circumference of the receiving recess 81.

A fitting hole 116 penetrating in the second rotation axis C2 direction is formed in the bottom portion 114*a* of the recess 114 at its radial center. The fitting hole 116 is formed in a circular shape centered on the second rotation axis C2 when viewed from the axial direction. The fitting hole 116 is larger than a diameter D3 of a circle that is centered on the second rotation axis C2 and contacts the radially outer circumference of the female thread portion 85 for the bolt, and smaller than a diameter D4 of a circle that contacts the radially inner circumference of the receiving recess 81. In the bottom 114*a* of the recess 114, a bracket through hole 115 (an example of the through hole in the claims) that penetrates in the axial direction is formed at a position corresponding to each receiving recess 81 radially outer than the fitting hole 116. The bracket through hole 115 communicates with the receiving recess 81. The diameter of the bracket through hole 115 is larger than the diameter of the fitting recess 81*a* of the receiving recess 81.

The holding plate 90 is fitted to a plate main body 92 received in the recess 114 of the attachment bracket 113 such that it projects from most of a radially center portion of the plate main body 92 toward the speed reducer 3 side to be fitted into the fitting hole 116. The plate main body 92 is formed in a disk shape that corresponds to the shape of the recess 114. The outer diameter of the plate body 92 is slightly smaller than the inner diameter of the recess 114. The plate main body 92 is formed with a plate through hole 90*a* penetrating in the axial direction at a position corresponding to each bracket through hole 115 of the recess 114. The plate through hole 90*a* communicates with the bracket through hole 115. The diameter of the plate through hole 90*a* is slightly larger than the outer diameter of the pin portion 80*a* of the reamer bolt 80.

In this configuration, the reamer bolt 80 is inserted into the plate through hole 90*a* and the bracket through hole 115 in this order from the side of the plate main body 92 away from the speed reducer 3. The male screw portion 80*b* of the reamer bolt 80 is engaged with the female thread portion 81*b* for the reamer bolt formed in the base plate portion 32 of the carrier 14. In this way, the attachment bracket 113 of the bucket 110 and the holding plate 90 are fastened and fixed to the base plate portion 32 of the carrier 14 by the reamer bolt 80.

A cylindrical resin bush 82 (an example of the buffer member in the claims) is fitted to the outer surface of the pin portion 80*a* of the reamer bolt 80 where corresponds to the bracket through hole 115. The resin bush 82 is also fitted to the inner surface of the bracket through hole 115. In other words, the resin bush 82 is provided between the outer surface of the reamer bolt 80 and the inner surface of the bracket through hole 115 while the reamer bolt 80 is fastened to the base plate portion 32 of the carrier 14. The side of the attachment bracket 113 of the resin bush 82 closer to the recess 11 is covered by the plate body 92 of the holding plate 90 and is not exposed to the outside.

The resin bush 82 is formed in a barrel-like shape and has a curved peripheral surface. That is, the outer peripheral diameter of the resin bush 82 gradually increases from its each end toward the middle in the axial direction. The maximum outer diameter of the resin bush 82 is the same as or slightly smaller than the diameter of the bracket through hole 115. The inner diameter of the resin bush 82 is the same as or slightly larger than the outer diameter of the reamer bolt 80.

The mechanical strength of the resin bush 82 is lower than the mechanical strength of the attachment bracket 113 and the reamer bolt 80. The mechanical strength can be expressed by, for example, Young's modulus. When Young's modulus is low, mechanical strength is also low. That is, the Young's modulus of the resin bush 82 is lower than the Young's modulus of the mounting bracket 113 and the reamer bolt 80. An annular spacer 94 surrounding the circumference of the reamer bolt 80 is disposed between the resin bush 82 and the plate main body 92, and between the resin bush 82 and the base plate portion 32 of the carrier 14. The spacer 94 reduces wear of the resin bush 82 on both ends in the axial direction.

The fitting portion 93 of the holding plate 90 is formed in a columnar shape that correspond to the shape of the fitting hole 116 of the attachment bracket 113. The outer diameter of the fitting portion 93 is slightly smaller than the inner diameter of the fitting hole 116. Thus, the fitting portion 93 is fitted into the fitting hole 116 with almost no rattling. The fitting portion 93 is formed with a fitting portion through hole 93*a* that penetrates in the axial direction at a position corresponding to the female thread portion 85 for the bolt in the base plate portion 32.

In this configuration, the holding plate attachment bolt 91 is inserted into the fitting portion through hole 93*a* from the side of the holding plate 90 away from the speed reducer 3. The holding plate attachment bolt 91 is engaged with the female thread portion 85 for the bolt in the base plate portion 32. In this way, the holding plate 90 is fastened and fixed to the base plate portion 32 of the carrier 14 by the holding plate attachment bolt 91. As described above, the holding plate mounting bolt 91 serves as a fastener that securely fastens the attachment bracket 113 of the bucket 110 to the carrier 14 via the holding plate 90. On the other hand, the reamer bolt 80 serves as a fastener that fastens the attachment bracket 113 of the bucket 110 to the carrier 14 and transmits the rotation of the carrier 14 to the attachment bracket 113. The transmission function of the reamer bolt 80 and operation of the drive transmission device 1 will be now described in detail.

<Operation of Drive Transmission Device>

When the motor 120 provided in the arm 109 is driven, the rotation of the motor shaft 120*a* is transmitted to the transmission gear 44, and the transmission gear 44 is rotated. Thus, the crankshaft 46 and the transmission gear 44 are integrally rotated on the crank rotation axis C4. When the crankshaft 46 is rotated, the first external gear 48*a* is rotated while meshing with the internal teeth 24 as the first eccentric portion 46*a* oscillatory moves. As the second eccentric portion 46*b* oscillatory moves, the second external gear 48*b* is rotated while meshing with the internal teeth 24. That is, the crankshaft 46 rotates on the crank rotation axis C4 and revolves around the second rotation axis C2.

In the present embodiment, the pillar portion 33 penetrating the first through hole 48*c* of the external gears 48*a* and 48*b* is fixed in a predetermined position together with the base plate portion 32. Thus, the carrier 14 rotates about the second rotation axis C2 at a reduced rotation speed than the rotation of the crankshaft 46. That is, the rotation of the carrier 14 rotates relative to casing 11 about the second rotation axis C2 at the reduced rotation speed. The casing 11 is fixed to the arm 109. The attachment bracket 113 for the bucket 110 is fixed to the carrier 14. Thus, by driving the motor 120 provided in the arm 109, the bucket 110 is rotationally moved about the second rotation axis C2 relative to the arm 109.

Power transmission from the carrier 14 to the attachment bracket 113 will be described in detail. The bucket 110 is fastened to the carrier 14 by the reamer bolts 80. Thus, when the carrier 14 is rotated, the rotational force of the carrier 14 is transmitted to the attachment bracket 113 of the bucket 110 via the reamer bolts 80 and the resin bushes 82. At this time, of the reamer bolt 80, the male screw portion 80*b* is engaged with the female thread portion 81*b* for the reamer bolt formed in the base plate portion 32 of the carrier 14. A part of the pin portion 80*a* is fitted in the fitting recess 81*a* of the base plate portion 32. Thus, it is firmly fixed to the base plate portion 32 although the reamer bolt 80 is cantilevered from the base plate portion 32. Therefore, the rotation of the carrier 14 is reliably transmitted via the reamer bolts 80 and the resin bushes 82.

The mechanical strength of the resin bush 82 is lower than the mechanical strength of the attachment bracket 113 and the reamer bolt 80. Thus, an external impact load applied to the bucket 110, for example, is absorbed by the resin bushes 82, which reduces the impact load transmitted to the carrier 14 via the reamer bolts 80. For example, when an external impact load is applied to the arm 109, the impact load is prevented from being transmitted to the bucket 110 via the speed reducer 3 and the reamer bolts 80.

As described above, in the above-mentioned first embodiment, the bracket through holes 115 into which the reamer bolts 80 are inserted are formed in the attachment bracket 113 of the bucket 110. The rotation of the carrier 14 is transmitted to the attachment bracket 113 via the reamer bolts 80. The resin bush 82 is provided between the outer lateral surface of the reamer bolt 80 and the inner surface of the bracket through hole 115, which is in the middle of the transmission path from the reamer bolt 80 to the attachment bracket 113. That is, the resin bush 82 that absorbs the external impact load is embedded in the bracket through hole 115. As described above, there is no need to provide a space for a device or the like that reduces an external impact load at a position separated from the speed reducer 3. The resin bush 82 that reduces the external impact load can be incorporated as almost a part of the speed reducer 3. Therefore, the drive transmission device 1 can be reduced in size while reducing the external impact load.

The resin bush 82 is used as a buffer member that reduces the external impact load. Therefore, it is possible to easily form the buffer member having a mechanical strength lower than that of the attachment bracket 113 and the reamer bolt 80. The resin bush 82 is formed in a barrel shape. Therefore, even when the carrier 14 and the attachment bracket 113 rattle and the attachment bracket 113 is slightly tilted with respect to the carrier 14, it is possible to prevent imbalance of the attachment bracket 113 in contacting the resin bush 82. Consequently, it is possible to prevent an extra load on the reamer bolt 80.

The receiving recess 81 formed in the base plate portion 32 of the carrier 14 for receiving the reamer bolt 80 includes the fitting recess 81*a* formed in the end surface 32*a* of the base plate portion 32 and the female thread portion 81*b* for the reamer bolt formed in the bottom of the fitting recess 81*a*. Therefore, in the reamer bolt 80, the male screw portion 80*b* is engaged with the female thread portion 81*b* for the reamer bolt formed in the base plate portion 32 of the carrier 14. A part of the pin portion 80*a* is fitted in the fitting recess 81*a* of the base plate portion 32. As a result, although the reamer bolt 80 is cantilevered from the base plate portion 32, the reamer bolt 80 can be firmly fixed to the base plate portion 32. Therefore, the rotation of the carrier 14 can be reliably transmitted to the attachment bracket 113 via the reamer bolts 80 and the resin bushes 82.

The holding plate 90 is provided at the bottom 114*a* of the recess 114 in the attachment bracket 113. The plate through hole 90*a* is formed in the holding plate 90, and the reamer bolt 80 is inserted from the side of the holding plate 90 away from the speed reducer 3. The holding plate 90 holds the resin bush 6 from the side opposite to the speed reducer 3. The holding plate 90 covers the recess 114 side of the attachment bracket 113 of the resin bush 82. Therefore, it is possible to prevent the resin bush 82 having a weak mechanical strength from being exposed to the outside. It is also possible to prevent foreign matter such as dusts and sands from coming into contact with the resin bush 82. In this way, the product life of the resin bush 82 can be extended.

The speed reducer 3 includes the cylindrical casing 11, the carrier 14 disposed radially inside the casing 11, and the speed reducer output portion 18 that rotates the carrier 14 at a rotation speed reduced at a predetermined ratio with respect to the rotation speed of the motor shaft 120*a*. The speed reducer output portion 18 includes the two or more crankshafts 46, and the first external gear 48*a* and second external gear 48*b* that oscillatory rotate in conjunction with the rotation of the crankshaft 46. Since a high output can be obtained at a high reduction ratio with the two speed reducers 3, the boom 108, the arm 109, and the bucket 110 can be operated appropriately while reducing the size of the drive transmission device 1. In the speed reducer 3, the internal gear 24 and the external gears 48*a*, 48 have a high contact ratio to each other, which improves the resistance of the drive transmission device 1 against overloads and impact loads.

Second Embodiment

<Drive Transmission Device>

Figure 6:
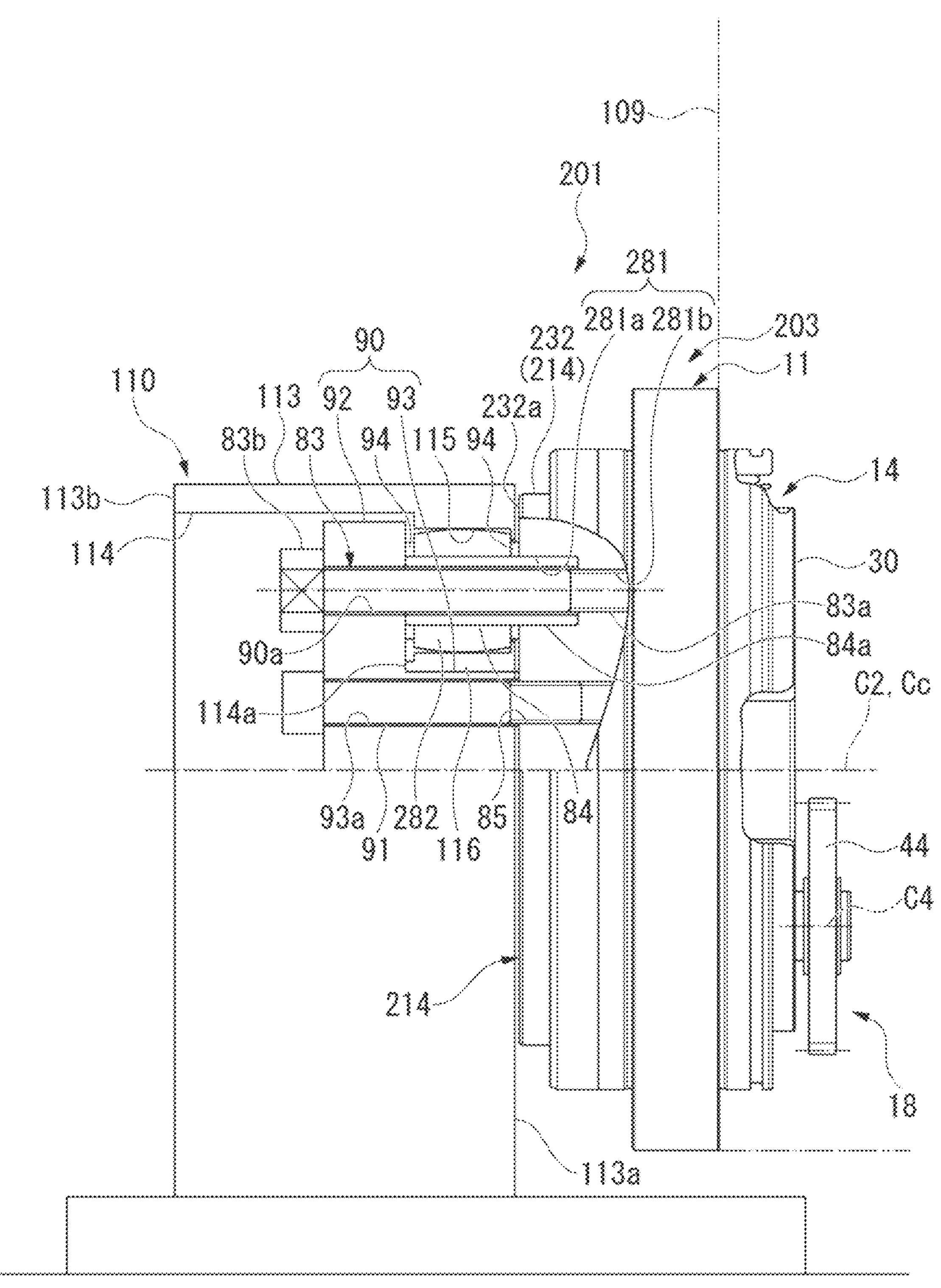
FIG. 6 shows a fixing structure between a reducer and a bucket mounting bracket in a second embodiment of the disclosure.

A second embodiment will now be described with reference to FIG. 6. Elements and components similar to those of the first embodiment are referred to using the same labels or referral numerals and description thereof will be omitted. FIG. 6 shows a fixing structure between a speed reducer 203 and the attachment bracket for the bucket 110 in a drive transmission device 201 of the second embodiment of the disclosure. FIG. 6 corresponds to FIG. 4 referred above. As shown in FIG. 6, the second embodiment is different from the first embodiment in that the drive transmission device has a fixing structure between the speed reducer 203 and the bucket 110 which is different from the fixing structure between the speed reducer 3 and the bucket 110 of the first embodiment.

More specifically, instead of the reamer bolt 80 of the first embodiment, an attachment bracket 110*a* is fastened to a base plate portion 232 of a carrier 214 by bolts 83 (one example of the fixing member in the claims) and hollow pins 84 (one example of the fixing member in the claims) that are fitted on the bolts 83. The bolt 83 includes a screw portion 83*a* and a head portion 83*b* coaxially and integrally formed with the screw portion 83*a* at one end of the screw portion 83*a* located on one side in the axial direction. The hollow pin 84 is formed in a pipe shape. The inner diameter of the hollow pin 84 is the same as or slightly larger than the outer diameter of the screw portion 83*a* of the bolt 83.

On an end surface 232*a* of the base plate portion 232 opposite to the end plate portion 30, a plurality of (for example, six in the first embodiment) receiving recesses 281 for receiving the screw portions 83*a* and the hollow pins 84 are equidistantly formed in the circumferential direction in the outer peripheral portion of the end surface 232*a*. The receiving recess 281 includes a fitting recess 281*a* formed in the end surface 232*a* of the base plate portion 232 and a female thread portion 281*b* formed in the bottom portion of the fitting recess 281*a*. One end portion 84*a* of the hollow pin 84 is fitted in the fitting recess 281*a*. The screw portion 83*a* of the bolt 83 is engaged with the female thread portion 281*b*.

A cylindrical resin bush 282 (an example of the buffer member in the claims) is fitted to the outer surface of the hollow pin 84 at the position corresponding to the bracket through hole 115 of the attachment bracket 113. That is, the hollow pin 84 is fitted between the bolt 83 and the resin bush 282. The mechanical strength of the resin bush 282 is lower than the mechanical strength of the attachment bracket 113 and the hollow pin 84. The resin bush 282 is formed in a barrel-like shape and has a curved peripheral surface. The inner diameter of the resin bush 282 is the same as or slightly larger than the outer diameter of the hollow pin 84.

Therefore, according to the above-described second embodiment, the same effect as that of the first embodiment is obtained. In addition, even when the bolt 83 is used instead of the reamer bolt 80 as the fixing member between the speed reducer 3 and the bucket 110, the tightening amount of the bolt 83 can be controlled by the hollow pin 84. Therefore, the end surface 232*a* of the base plate portion 232 and the holding plate 90 can be maintained at an appropriate distance from each other. Therefore, it is possible to prevent an extra load from being applied to the reducer 3 due to overtightening of the bolt 83.

The present disclosure is not limited to the above embodiments but encompasses various modifications of the above embodiments not departing from the purport of the present disclosure. For example, in the above-described embodiment, the drive transmission devices 1, 201 for driving the bucket 110 relative to the arm 109 have been described with the case where the motor 120 is provided in the arm 109. Whereas when the boom 108 is driven relative to the slewable upper structure 103, the motor 120 may be provided in either the slewable upper structure 103 or the boom 108. When driving the arm 109 relative to the boom 108, the motor 120 may be provided in either the boom 108 or the arm 109.

In the above embodiments, described was the case where the excavator 100 is provided with the drive transmission devices 1, 201 for driving the boom 108, the arm 109, and the bucket 110 of the excavator 100, which is a construction machine. However, the drive transmission devices 1, 201 can be used for various devices without limitation. For example, when the drive transmission devices 1, 201 are provided to any other machines or devices other than the construction machine, various types of drive source can be adopted in stead of the motor. For example, an engine or the like can be adopted instead of the motor.

In the above-described embodiments, the case where the drive transmission device 1, 201 includes the two speed reducers 3 that reduce the rotation speed of the crankshafts 46 (motor shafts 120*a*) and outputs the reduced rotation has been described. However, the disclosure is not limited to this, and instead of the speed reducer 3, a speed increaser that increases the rotation speed of the crankshaft 46 (motor shaft 120*a*) may be provided. Anything that changes the rotation speed of the crankshaft 46 (motor shaft 120*a*) may be used.

In the above-described embodiment, the case where the resin bushes 82, 282 are used as the buffer member having the mechanical strength lower than the mechanical strength of the mounting bracket 113, the reamer bolt 80, the bolt 83 and the hollow pin 84 has been described. However, the disclosure is not limited to this, and various buffer members can be used in place of the resin bushes 82 and 282. The mechanical strength of the buffer member may be lower than the mechanical strength of the attachment bracket 113, the reamer bolt 80, the bolt 83 and the hollow pin 84.

In the above-described embodiments, the speed reducer 3 includes the cylindrical casing 11, the carrier 14 disposed radially inside the casing 11, and the speed reducer output portion 18 that rotates the carrier 14 at a rotation speed reduced at a predetermined ratio with respect to the rotation speed of the motor shaft 120*a*. The deceleration output unit 18 has been described as a so-called eccentric oscillating speed reducer that includes the two or more crankshafts 46, and the first external gear 48*a* and second external gear 48*b* that oscillatory rotate in conjunction with the rotation of the crankshaft 46. However, the speed reducer 3 is not limited to this, and the speed reducer 3 may have any configuration provided that it includes a first member (for example, the casing 11) and a second member (for example, the carrier 14) that rotate relative to each other about the same second rotation axis C2, and at least one crankshaft (for example, the crankshaft 46) that is disposed between the first and second members and is rotated about a rotation axis along the second rotation axis C2 by the rotation of the drive source (for example, the motor 120). The speed reducer output portion 18 may be an eccentric oscillating speed reducer that reduces the rotation speed of the crankshaft and transmits it to the second member to rotate the second member relative to the first member at a reduced rotation speed.

For example, an eccentric oscillating speed reducer having a single crankshaft will be specifically described. The speed reducer in this case has a so-called center crankshaft coaxial with the second rotation axis C2 as the crankshaft. In conjunction with the rotation of the center crankshaft, the first external gear 48*a* and the second external gear 48*b* are oscillatory rotated.

In the above-described embodiment, the case where the attachment bracket 113 (the bucket 110, the second member) is used as the fixing member on the carrier 14 and the reamer bolt 80, the bolt 83, and the hollow pin 84 are used has been described. However, the disclosure is not limited to this, and anything may be used as long as the second member can be fixed to the carrier 14. In the above-described embodiment, the case where the boom 108, the arm 109, and the bucket 110 are rotatably connected to each other via the drive transmission device 1 has been described. However, the disclosure is not limited to this, and at least one connection between the slewable upper structure 103 and the boom 108, between the boom 108 and the arm 109, and between the arm 109 and the bucket 110 may be configured to be coupled via the drive transmission device 1.

In the above-described embodiment, to fix the attachment bracket 113 to the carrier 14, the six reamer bolts 80 or bolts 83 (hollow pins 84) are provided and arranged at equal intervals in the circumferential direction. And the case where the four holding plate bolts 91 are provided at the radially inner than the reamer bolts 80 or the bolts 83 (hollow pins 84) and arranged at equal intervals in the circumferential direction has been described. However, the number and position of the reamer bolts 80, the bolts 83 (hollow pins 84), and the holding plate mounting bolts 91 are not limited to this, and can be appropriately changed. For example, the reamer bolts 80 or the bolts 83 (hollow pins 84) and the holding plate mounting bolts 91 may be alternately arranged in the circumferential direction on the same pitch circle.

The shape of the holding plate 90 is not limited to the above-described embodiment. The holding plate 90 may be configured in any manner provided that it presses the resin bushes 82 and 282 from the side opposite to the speed reducer 3. For example, the holding plate 90 may be formed in a simple plate shape.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:

1. A drive transmission device, comprising:

a first member having a drive source that generates a rotational force;

a speed changer provided in the first member, the speed changer having an output portion that changes a speed of rotation of the drive source and outputting a speed-changed rotation;

a second member fixed to the output portion with a fixing member, the second member having a through hole for receiving the fixing member therein; and a buffer member disposed between an inner surface of the through hole and an outer lateral surface of the fixing member;

wherein a mechanical strength of the buffer member is lower than a mechanical strength of the second member and a mechanical strength of the fixing member, wherein the fixing member includes:

a bolt inserted in the through hole; and a hollow pin fitted between the bolt and the buffer member, and wherein the output portion includes:

a female thread portion for receiving the bolt engaged therewith; and a fitting recess for receiving one end of the hollow pin situated one side in its axial direction.

2. The drive transmission device of claim 1, wherein the buffer member is formed of resin.

3. The drive transmission device of claim 1, further comprising: a holding plate provided on a side of the second member opposite to the output portion such that it covers the buffer member, wherein the holding plate has a plate through hole for receiving the fixing member.

4. The drive transmission device of claim 1, wherein the speed changer includes:

a casing relatively rotates about a first rotation axis and the output portion;

at least one crankshaft disposed between the casing and the output portion, the crankshaft being rotated on a second rotation axis extending along the first rotation axis by the rotation of the drive source; and an external teeth member having external teeth that are oscillatory rotated about the first rotation axis by the crankshaft, wherein the casing has internal teeth that mesh with the external teeth, wherein the casing is fixed to the first member, wherein the output portion rotatably supports the crankshaft and is rotatably supported by the casing via a bearing, and wherein the output portion rotates at a reduced speed than that of the rotation of the crankshaft.

5. A construction machine, comprising:

a vehicle body;

a first member provided in the vehicle body and having a drive source that generates a rotational force;

a speed changer provided in the first member, the speed changer having an output portion that changes a speed of rotation of the drive source and outputting a speed-changed rotation;

a second member fixed to the output portion with a fixing member, the second member having a through hole for receiving the fixing member therein; and a buffer member provided between an internal surface of the through hole and an external lateral surface of the fixing member, wherein a mechanical strength of the buffer member is lower than a mechanical strength of the second member and a mechanical strength of the fixing member, wherein the fixing member includes:

a bolt inserted in the through hole; and a hollow pin fitted between the bolt and the buffer member, and wherein the output portion includes:

a female thread portion for receiving the bolt engaged therewith; and a fitting recess for receiving one end of the hollow pin situated one side in its axial direction.

* * * * *